(12) United States Patent  (10) Patent No.: US 9,025,180 B2
Patara  (45) Date of Patent: May 5, 2015

(54) MOBILE SCAN METHOD AND SYSTEM

(75) Inventor: Nishchal Patara, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 384 days.

(21) Appl. No.: 13/459,463

(22) Filed: Apr. 30, 2012

(65) Prior Publication Data

US 2013/0286417 A1    Oct. 31, 2013

(51) Int. Cl.
*G06F 15/00* (2006.01)
*G06K 15/02* (2006.01)
*H04N 1/00* (2006.01)
*H04N 1/32* (2006.01)

(52) U.S. Cl.
CPC ............ *G06K 15/02* (2013.01); *H04N 1/00225* (2013.01); *H04N 1/00233* (2013.01); *H04N 1/00307* (2013.01); *H04N 1/32106* (2013.01); *H04N 2201/0094* (2013.01); *H04N 2201/3278* (2013.01); *H04N 2201/3226* (2013.01); *H04N 2201/3208* (2013.01)

(58) Field of Classification Search
CPC ........................ H04N 1/00225; H04N 1/00233
USPC ........................................................ 358/1.15
See application file for complete search history.

(56) References Cited

U.S. PATENT DOCUMENTS

| | | | |
|---|---|---|---|
| 6,430,601 B1 | 8/2002 | Eldridge et al. | |
| 7,228,365 B2 | 6/2007 | Schlonski et al. | |
| 7,930,407 B2 | 4/2011 | Ragnet et al. | |
| 2010/0149572 A1 | 6/2010 | St. Jacques, Jr. et al. | |
| 2010/0309503 A1 | 12/2010 | Partridge et al. | |
| 2011/0040823 A1 | 2/2011 | Liu et al. | |
| 2011/0096354 A1 | 4/2011 | Liu | |
| 2011/0099264 A1 | 4/2011 | Chapin et al. | |
| 2011/0216333 A1 | 9/2011 | Rabb | |
| 2011/0216349 A1 | 9/2011 | McCorkindale et al. | |
| 2011/0282729 A1 | 11/2011 | Gnanasambandam et al. | |
| 2012/0008161 A1 | 1/2012 | Rouhana | |
| 2012/0033248 A1 | 2/2012 | Farrell | |
| 2012/0036422 A1 | 2/2012 | Walczyk et al. | |
| 2012/0057189 A1 | 3/2012 | DeRoller | |
| 2012/0081758 A1* | 4/2012 | Jang .............................. | 358/402 |

OTHER PUBLICATIONS

U.S. Appl. No. 13/286,643, filed Nov. 1, 2011, Tse et al.
U.S. Appl. No. 13/096,681, filed Apr. 28, 2011, DeRoller.
U.S. Appl. No. 12/959,066, filed Dec. 2, 2010, DeRoller.
Internet web site: www.office.xerox.com/eip/enus.html, dated Feb. 13, 2012, entitled "Xerox Extensible Interface Platform EIP", 2 pages.
Internet web site: www.en.wikipedia.org/wiki/Clous_computing, dated Dec. 8, 2011 and entitled "Cloud Computing", 13 pages.
Brochure entitled "Xerox Mobil Print Solution" by Matt DeRoller and dated Dec. 8, 2011, 4 pages.

(Continued)

*Primary Examiner* — Saeid Ebrahimi Dehkord
(74) *Attorney, Agent, or Firm* — Fay Sharpe LLP

(57) ABSTRACT

A system and method are disclosed having different multi-functional devices that are in communication with a portable device such as a mobile phone, laptop or the like. A scanned document or image is received from one of the multi-functional devices as well as one or more destination addresses. The scanned document is communicated to a cloud computing server that generates at least one confirmation code or token in response and communicates the confirmation code to the portable device. Upon receiving the confirmation code at a second multi-functional device, the system prints a hardcopy of the scanned image.

25 Claims, 3 Drawing Sheets

(56) References Cited

OTHER PUBLICATIONS

Brochure entitled "Expanding the MFP Ecosystem With Xerox's Extensible Interface Platform (EIP)" by Brian Bissett, Bissett Communications Corp., dated Jun. 2008, 18 pages.

Brochure entitled "Xerox Extensible Interface Platform (EIP), Your Work Just Got Easier", by Xerox Corporation, copyright 2008, 4 pages.

* cited by examiner

MOBILE SCAN METHOD AND SYSTEM

BACKGROUND

This disclosure relates generally to imaging and printing multi-functional device systems or image reproduction machines, and more particularly is directed to systems and methods that scan and deliver a document according to different criteria.

People can utilize laptops and handheld devices to create documents while on the go, traveling, transitioning from one place to another, working in remote environments away from home, or from a variety of different environments. But until recently, printing and/or scanning those documents could be tricky. Handheld devices, such as mobile phones, PDA's and the like, for example, often have scaled-down operating systems that do not always have built-in printing or scanning capabilities. Laptops can print, but only if the user can find a printer, connect to it and install the right driver. Other alternatives are not always as feasible, such as saving a document to disk and visiting a copy shop, which is not always conveniently located. This can be even more challenging when a user wants to scan a document and deliver the scanned document electronically to a recipient whom may not have the ability to print the scanned document.

Mobile printing is a generic term for products and services that let people print documents when they are away from a traditional network or a local printer. Usually, mobile printing is wireless. The service may use Bluetooth or 802.11 networking (both of which use radio waves) to communicate. Some older handheld devices use infrared signals, similar to the signals most TV remote controls use.

Many problems are inherent in using mobile devices to print or receive scanned documents. PDAs, for example, often use scaled-down versions of programs, and sometimes their operating systems do not include print capabilities at all. In order to print from many PDAs and smart phones, a user must first download printing software. That software has to efficiently process documents so the print job doesn't overwhelm the device's memory. In addition, documents printed from handheld devices don't always look like they do when printed from desktop or laptop computers. This is because handhelds don't have enough processing power to handle print output very well. The printing software often has to simplify or modify the document for printing. Also, since handhelds have less memory than laptops it can take longer for them to process print/scan jobs. Further, some mobile printing programs work a little differently where the device sends documents to fax machines rather than printers. The process works similar to faxing over email. The user selects an email message that has a document attached and then enters a fax number.

A need exists to efficiently and effectively scan documents and enable portable devices to print the scanned document without transferring a soft copy of the document via email, via an office personal computer (PC) or via a removable memory such as a memory card.

INCORPORATION BY REFERENCE

U.S. Patent Application Publication No. 2010/0149572 by St. Jacques, Jr. et al., published Jun. 17, 2010 and entitled "METHOD AND SYSTEM FOR AUTOMATICALLY PROVIDING FOR MULTI-POINT DOCUMENT STORING, ACCESS, AND RETRIEVAL";

U.S. Patent Application Publication No. 2010/0309503 by Partridge et al., published Dec. 9, 2010 and entitled "METHOD AND SYSTEM FOR PRINTING DOCUMENTS FROM A PORTABLE DEVICE";

U.S. Patent Application Publication No. 2011/0040823 by Liu et al., published Feb. 17, 2011 and entitled "SYSTEM AND METHOD FOR COMMUNICATING WITH A NETWORK OF PRINTERS USING A MOBILE DEVICE";

U.S. Patent Application Publication No. 2011/0096354 by Liu, published Apr. 28, 2011 and entitled "SYSTEM AND METHOD FOR HANDLING PRINT REQUESTS FROM A MOBILE DEVICE";

U.S. Patent Application Publication No. 2011/0099264 by Chapin et al., published Apr. 28, 2011 and entitled "NETWORK DEVICE DISCOVERY";

U.S. Patent Application Publication No. 2011/0216333 by Rabb, published Sep. 8, 2011 and entitled "SYSTEM AND METHOD FOR USING A MULTI-FUNCTION PRINTER AS A USER INTERFACE FOR A PRINT DRIVER";

U.S. Patent Application Publication No. 2011/0216349 by McCorkindale et al., published Sep. 8, 2011 and entitled "DELAYED PRINTING FROM A COMPUTERIZED DEVICE";

U.S. Patent Application Publication No. 2011/0282729 by Gnanasambandam et al., published Nov. 17, 2011 and entitled "SYSTEM AND METHOD TO PRODUCE AND CONTROL SUBSIDIZATION OF TARGETED MATERIALS AT POINT OF SALE";

U.S. Patent Application Publication No. 2012/0057189 by DeRoller, published Mar. 8, 2012 and entitled "METHOD AND SYSTEM FOR TRACKING THE STATUS OF A REMOTE RENDERING JOB";

U.S. Patent Application Publication No. 2012/0036422 by Walczyk et al., published Feb. 9, 2012 and entitled "SYSTEM AND METHOD FOR RENDERING FORMS BASED ON AN IDENTIFICATION NUMBER";

U.S. Patent Application Publication No. 2012/0033248 by Farrell, published Feb. 9, 2012 and entitled "SYSTEM AND METHOD FOR GENERATING A REMOTE JOB SUBMISSION ACCELERATOR REPORT IN A MULTI-FUNCTION DEVICE";

U.S. Patent Application Publication No. 2012/0008161 by Rouhana, published Jan. 12, 2012 and entitled "AUTOMATED SYSTEM AND METHOD FOR SUBMITTING A RENDERING JOB VIA A MOBILE COMMUNICATIONS DEVICE";

U.S. patent application No. 6,430,601 by Eldridge et al., issued Aug. 6, 2002 and entitled "MOBILE DOCUMENT PAGING SERVICE";

U.S. patent application No. 7,228,365 by Schlonski et al., issued Jun. 5, 2007 and entitled "SYSTEM FOR DETERMINING COMMUNICATION PARAMETERS ASSOCIATED WITH AN UNKNOWN DIGITAL PRINTER";

U.S. patent application No. 7,930,407 by Ragnet et al., issued Apr. 19, 2011 and entitled "METHOD AND APPARATUS FOR CONTROLLING DOCUMENT SERVICE REQUESTS FROM A MOBILE DEVICE";

U.S. patent application Ser. No. 13/286,643 by Tse et al., filed Nov. 1, 2011 and entitled "SYSTEMS AND METHODS FOR APPEARANCE-INTENT-DIRECTED DOCUMENT FORMAT CONVERSION FOR MOBILE PRINTING";

U.S. patent application Ser. No. 13/096,681 by DeRoller, filed Apr. 28, 2011 and entitled "MOBILE ACCESS NOTIFICATION SERVICE INTERFACE";

U.S. patent application Ser. No. 12/959,066 by DeRoller, filed Dec. 2, 2010 and entitled "PRINT GOVERNANCE OF REMOTE AND MOBILE WORKER USING EXTENSIBLE INTERFACE PLATFORM (EIP)";

Internet web site: www.office.xerox.com/eip/enus.html, dated Feb. 13, 2012 and entitled "XEROX EXTENSIBLE INTERFACE PLATFORM EIP";

Internet web site: www.en.wikipedia.org/wiki/Cloud computing, dated Dec. 8, 2011 and entitled "CLOUD COMPUTING"

Brochure entitled "XEROX MOBIL PRINT SOLUTION" by Matt DeRoller and dated Dec. 8, 2011;

Brochure entitled "EXPANDING THE MFP ECOSYSTEM WITH XEROX'S EXTENSIBLE INTERFACE PLATFORM (EIP)" by Brian Bissett, Bissett Communications Corp., dated June, 2008; and, Brochure entitled "XEROX EXTENSIBLE INTERFACE PLATFORM (EIP), YOUR WORK JUST GOT EASIER", by Xerox Corporation, copyright 2008; are all incorporated hereby reference in their entirety.

BRIEF DESCRIPTION

The following presents a simplified summary in order to provide a basic understanding of one or more aspects of the disclosure. This summary is not an extensive overview and is neither intended to identify key or critical elements, nor to delineate the scope thereof. Rather, the primary purpose of the summary is to present some concepts of the disclosure in a simplified form as a prelude to the more detailed description that is presented later.

In one embodiment of this disclosure, described is a method of printing a copy of a scanned image and delivering the scanned image to a recipient using a web based network, the web based network operatively connecting a scanning device including a scanner user interface (UI), one or more servers, a printing device including a print device user interface, and a portable communication device, the portable communication device associated with a respective recipient, the method comprising a) scanning an image utilizing the scanning device and entering a recipient email address into the scanner user interface, the recipient email address associated with a desired recipient of the scanned image; b) the scanning device communicating the scanned image and recipient email address to the one or more servers; c) the one or more servers communicating a token to the recipient email address; d) the recipient receiving an email on the portable communication device, the email including the token; e) the recipient entering the token into the printing device user interface associated with the printing device; f) the printing device communicating to the one or more servers the token; g) the one or more servers communicating the scanned image to the printing device; and h) the printing device printing the scanned image on a media substrate.

In another embodiment of this disclosure, described is an image scanning and printing system comprising a scanning device including a scanner user interface; one or more servers; a printing device; a portable communication device; and a web based network operatively connecting the scanning device, the one or more servers, the printing device and the portable communication device, the image scanning and printing system configured to perform the method comprising a) scanning an image utilizing the scanning device and entering a recipient email address into the scanner user interface, the recipient email address associated with a desired recipient of the scanned image; b) the scanning device communicating the scanned image and recipient email address to the one or more servers; c) the one or more servers communicating a token to the recipient email address; d) the recipient receiving an email on the portable communication device, the email including the token; e) the recipient entering the token into the printing device user interface associated with the printing device; f) the printing device communicating to the one or more servers the token; g) the one or more servers communicating the scanned image to the printing device; and h) the printing device printing the scanned image on a media substrate.

In still another embodiment of this disclosure, described is a web-based network of one or more servers, the web-based network of one or more servers operatively connected to a scanning device including a scanner user interface, a printing device including a printing device user interface, and a portable communication device, the web-based network configured to a) receive a scanned image and recipient email address from the scanning device; b) communicate a token to the recipient email address for viewing by a recipient associated with the portable device; c) communicating with the printing device to receive the token entered by the recipient at the printing device user interface; and d) communicating the scanned image to the printing device.

DETAILED DESCRIPTION

Figure 1:
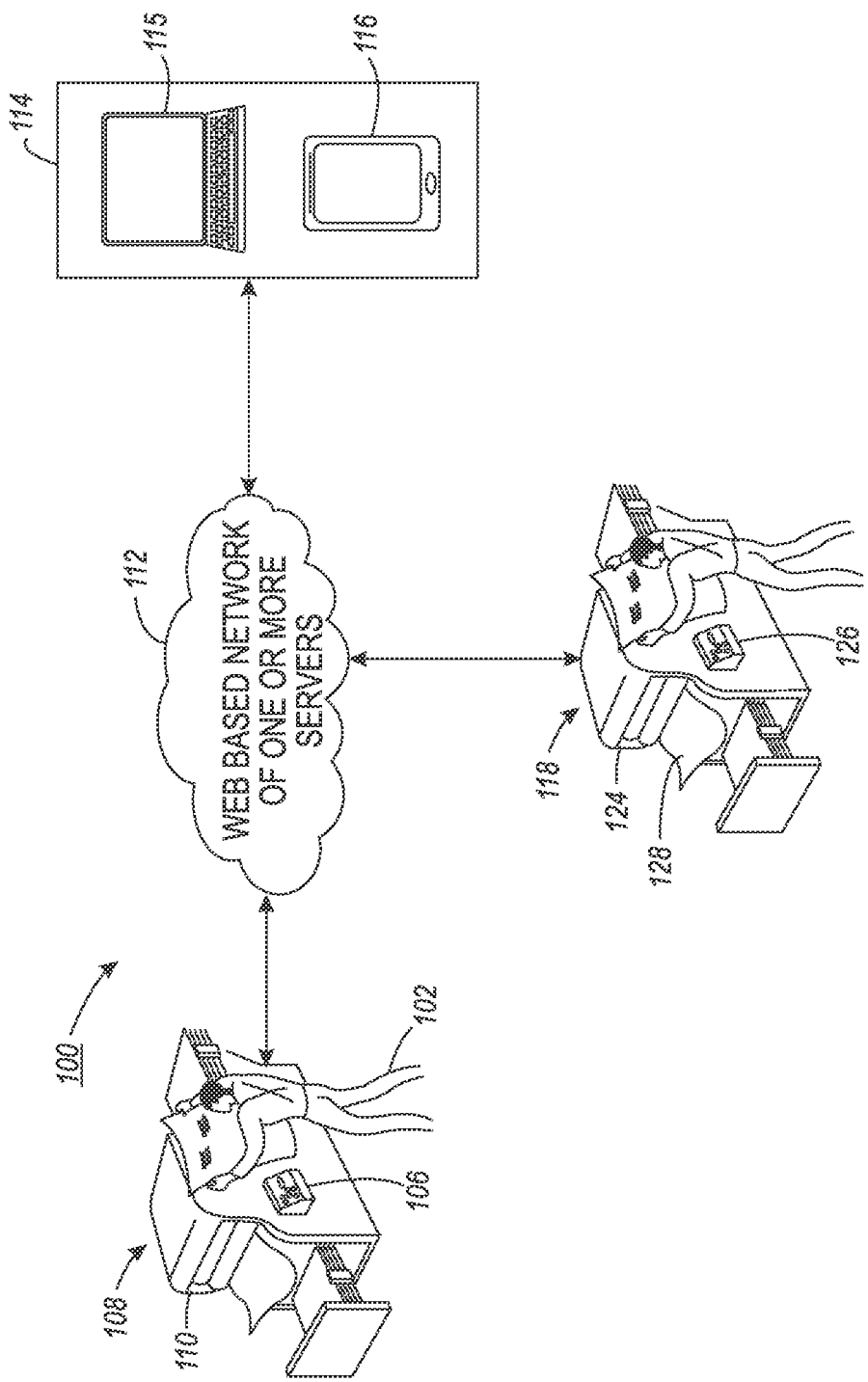
FIG. 1 is a schematic representation of an exemplary image forming system according to one aspect of the disclosure.

One or more implementations of the present disclosure will now be described with reference to the attached drawings, wherein like reference numerals are used to refer to like elements throughout. Aspects of the exemplary embodiment relate to a system and method for scanning an image with a scanning device operatively associated with a network of multi-functional devices (MFDs), or an image forming station, that generates scanning job requests by a user and communicating transfers imaged hardcopy files to a cloud server along with a list of email addresses entered by the user designating recipients of the hard copy file. The cloud server then communicates a token/confirmation code to the email addresses designated. The cloud server then communicates a token/confirmation code to the email addresses designated. Thus, a user of a portable device is able to print a scanned image or document, such as an email, a word document, a graphic image, text, a .pdf document, presentation slides, etc. on an MFD, such as a printer station or image forming system by entering the token/confirmation code at the UI operatively associated with the printing station. Upon the cloud server receiving the token/confirmation code, the cloud server communicates the hard copy file representative of the scanned image to the printing station for printing. In other words, the token/confirmation code is communicated to one or more portable devices respectively associated with the one or more addresses for receiving communications thereat. A user of the portable device is then able to locate any other MFD that is an extensible interface platform (EIP) enabled device and print the image with the confirmation code. The EIP enabled MFD device retrieves the hard copy file of the image from the cloud server and prints an unaltered or unedited hardcopy of the original scanned image where no soft copy is provided.

FIG. 1 illustrates one embodiment of an exemplary scanning system 100 for scanning hardcopy images and generating hardcopies 128 of the images to one or more different users of portable devices 114. The system includes a first MFD 108 and a second MFD 118 and one or more portable devices 114 such as a laptop computer 115 and a smartphone 116, devices that are communicatively coupled via a cloud computing network/server 112. The first MFD includes a scanner module 110 to provide scanning capability for a user 102 of the system, and a user interface 106. The second MFD 118 is EIP enabled and includes a printer module 124 and a user interface 126, therein, while the portable devices include devices such as hand-held devices, PDAs, laptops, mobile phones, and the like, for example. Although portable devices are described, other devices can include desktop PCs and the like that are not portable.

If a user desires to share a hardcopy of an image/document, oftentimes a facsimile system is a viable means to transmit the hardcopy. Fax machines exist in various forms. Although businesses usually maintain some kind of fax capability, the technology has faced increasing competition from alternatives. However, fax machines still retain some advantages, particularly in the transmission of sensitive material which, if sent over the Internet unencrypted, may be vulnerable to interception. In some countries, because electronic signatures on contracts are not recognized by law while faxed contracts with copies of signatures are, fax machines enjoy continuing support in business. The present system has the added advantage of being secure and not requiring a second receiving device to be available at the time of electronically sending the faxed image.

According to one exemplary embodiment, the system includes a plurality of multi-functional devices (MFDs) that have various functions, such as printing, faxing, scanning, emailing, and the like that can aid in a business environment or other setting. A device operating as an MFD, for example, is capable of scanning an image or document, storing the image in a memory and printing the image with an associated printer engine. The printed image is a hardcopy of a document including text and/or graphics. The system disclosed is not limited to MFDs and may include stand-alone scanner systems and printer systems coupled to a processor that controls the devices and processes commands thereat.

The scanning MFD further includes a user interface that prompts a user to enter any number of addresses when an image is scanned at the scanner module. The addresses entered may be mobile telephone numbers, email addresses and the like for electronically communicating to one or more recipients information related to a scanned document image. After the one or more addresses are entered by a user at the user interface and the user scans an image, the device communicates to a cloud server. The cloud server utilizes a mobile print/scan utility to generate a confirmation code or token communicating to the one or more addresses.

Notably, for purposes of this disclosure, cloud computing is the delivery of computing as a service rather than a product, whereby shared resources, software and information are provided to computers and other devices as a utility over a network (typically the Internet).

Described below are further details and other exemplary embodiment of this disclosure.

Figure 2:
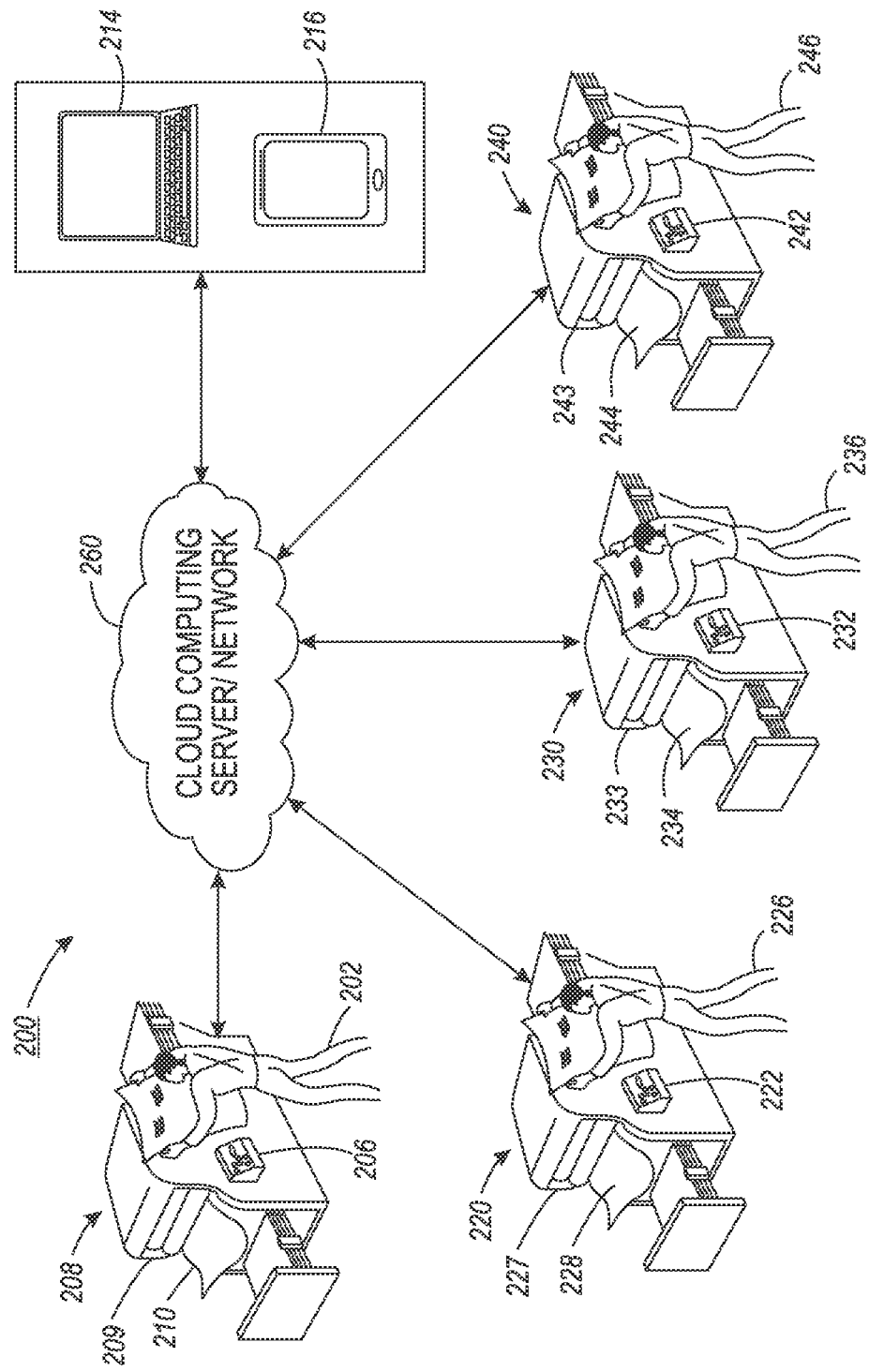
FIG. 2 is a schematic representation of an exemplary image forming system according to another aspect of the present disclosure.

With reference to FIG. 2, illustrated is another exemplary embodiment of a web based image scanning and printing system 200 according to this disclosure, generally referred to as a mobile scan system.

The mobile scan system includes a first MFD 208, a second MFD 220, a third MFD 230, a fourth MFD, a laptop computer 214 and a mobile device 216, such as a smart phone, mobile phone, PDA, etc. All devices are operatively connected via a cloud computing server/network 260.

As shown, each MFD includes a scanning module 209, 227, 233, 243, a printing module 210, 228, 234 and 244 and a UI (user interface) 206, 222, 232 and 242. In addition, for purposes of discussion, each MFD is associated with a user/operator 202, 226, 236 and 246.

In addition, each MFD includes hardware/software to provide an EIP platform which may be an extension to a mobile print service.

Figure 3:
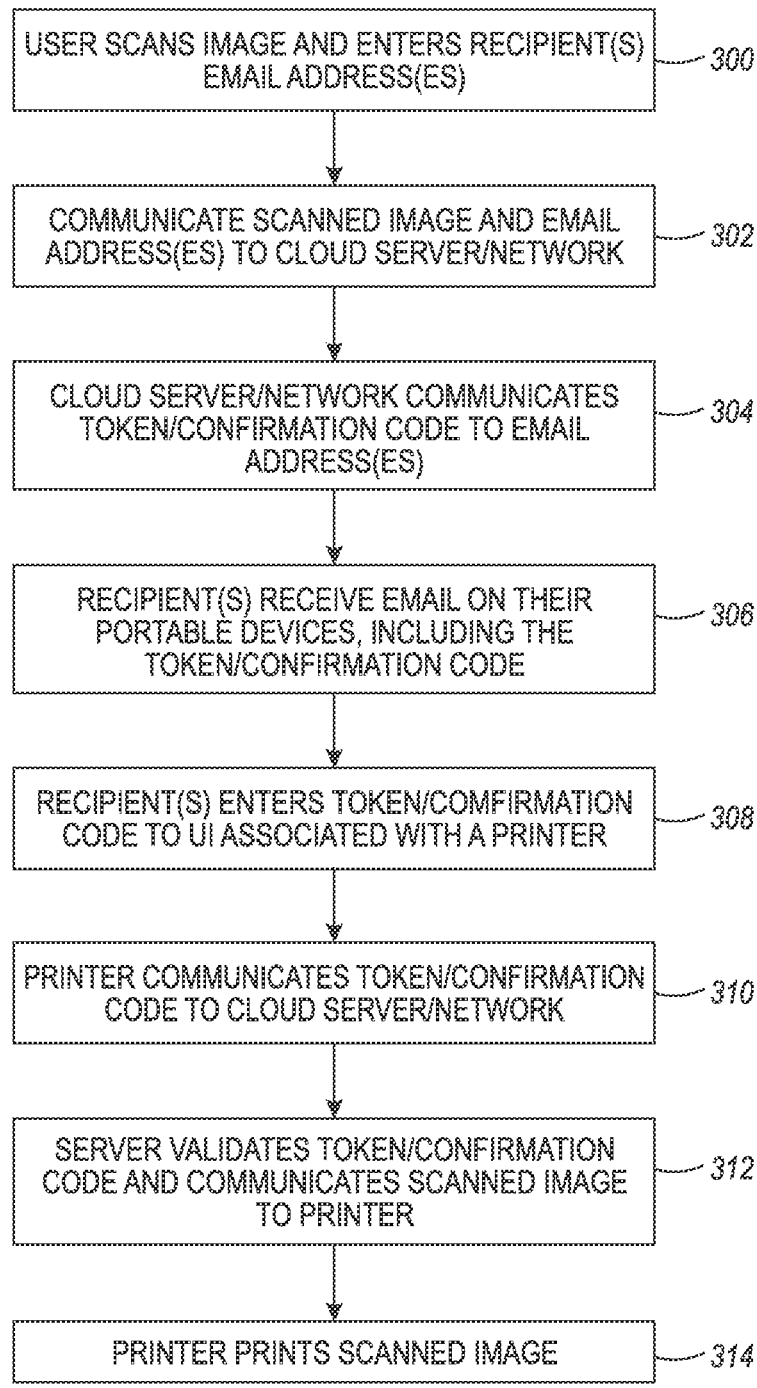
FIG. 3 is a flowchart detailing an exemplary method for an image forming system.

With reference to FIG. 3, illustrated is a flow chart of a method of operation, of a mobile scan system as shown in FIG. 2.

Initially, at step 300, a user scans an image to be delivered in hard copy form to one or more recipients. For example, user 246 scans a document using MFD 240, and USER 246 enters a plurality of recipient email addresses via UI 242.

Next, at step 302, MFD 240 communicates the scanned image and email addresses to the web based cloud computing server/network 260.

Next, at step 304, the cloud computing server/network 260 communicates a generated token/confirmation code to each of the email addresses received from MFD 240.

Next, at step 306, the recipients associated with the email addresses each receive via laptop computer 214, and/or a smart phone 216, an email including the token/confirmation code, along with a message indicating the relevance of the token/confirmation code.

At this point, step 308, if a recipient desires to read or view the document associated with the token/confirmation code, the recipient must locate MFD 208, MFD 220, MFD 230 or MDF 240 and enter the token confirmation code via a UI associated with the located MED. For example, the recipient locates MFD 220 and enters the token/confirmation code via UI 222.

Next, at step 310, the located MFD, here MFD 220, communicates the token/confirmation code to the cloud server/network 260.

Next, at step 312, the cloud server/network 260 validates the received token/confirmation code, and assuming the code is valid, communicates the hard copy scanned image, i.e. document, to MFD 220.

Finally, at step 314, MFD 220 prints the document and it becomes available for the recipient to view.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated in FIG. 3, and throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following him claims.

What is claimed is:

1. A method of printing a copy of a scanned image and delivering the printed copy of the scanned image to a recipient using a web based network, the web based network operatively connecting a scanning device including a scanner user interface (UI), one or more servers, a printing device operatively independent of the scanning device and including a print device user interface, and a portable communication device, the portable communication device associated with a respective recipient, the method comprising:
   a) scanning an image utilizing the scanning device and entering a recipient email address into the scanner user interface, the recipient email address associated with a desired recipient of the printed copy of the scanned image;
   b) the scanning device communicating the scanned image and recipient email address to the one or more servers;
   c) the one or more servers communicating a token to the recipient email address and the one or more servers not communicating the scanned image to the recipient email address;
   d) the recipient receiving an email on the portable communication device, the email including the token and not including the scanned image;
   e) the recipient entering the token into the printing device user interface associated with the printing device;
   f) the printing device communicating to the one or more servers the token;
   g) the one or more servers communicating the scanned image to the printing device; and
   h) the printing device printing the scanned image on a media substrate to deliver the printed copy of the scanned image to the recipient.

2. The method according to claim 1, wherein the one or more servers are associated with a web-based cloud environment.

3. The method according to claim 1, wherein the scanning device and printer provide an Extensible User Interface (EUF) platform.

4. The method according to claim 1, wherein the one or more servers provide a mobile print service.

5. The method according to claim 1, wherein the portable communication device is one of a smart phone, mobile phone, lap top computer, desktop computer, and other personal computing device.

6. The method according to claim 1, wherein the token is a token number.

7. The method according to claim 1, wherein the scanning device is associated with a first MFD (Multi-function Device) and the printing device is associated with a second MFD.

8. The method according to claim 1, wherein the scanning device is one of a plurality of MFDs and the printing device is one of the plurality of MFDs.

9. The method according to claim 8, wherein
   a plurality of recipient email addresses are entered at the scanning device user interface in step a), and communicated to the one or more servers in step b);
   the token is communicated to the plurality of recipient email addresses in step c);
   a plurality of recipients associated with the email addresses each perform steps e)-h) at any one of the MFDs to obtain a hard copy of the scanned image.

10. The method according to claim 1, wherein step g) validates the token before communicating the scanned image to the printing device.

11. The image scanning and printing system according to claim 10, wherein the scanning device is associated with a first MFD (Multi-function Device) and the printing device is associated with a second MFD.

12. An image scanning and printing system comprising:
a scanning device including a scanner user interface;
one or more servers;
a printing device operatively independent of the scanning device;
a portable communication device; and
a web based network operatively connecting the scanning device, the one or more servers, the printing device and the portable communication device, the image scanning and printing system configured to perform a method of printing a copy of a scanned image and delivering the printed copy of the scanned image to a recipient using the web based network comprising:
i) scanning an image utilizing the scanning device and entering a recipient email address into the scanner user interface, the recipient email address associated with a desired recipient of the printed copy of the scanned image;
j) the scanning device communicating the scanned image and recipient email address to the one or more servers;
k) the one or more servers communicating a token to the recipient email address and not communicating the scanned image to the recipient email address;
l) the recipient receiving an email on the portable communication device, the email including the token and not including the scanned image;
m) the recipient entering the token into the printing device user interface associated with the printing device;
n) the printing device communicating to the one or more servers the token;
o) the one or more servers communicating the scanned image to the printing device; and
p) the printing device printing the scanned image on a media substrate to deliver the printed copy of the scanned image to the recipient.

13. The image scanning and printing system according to claim 12, wherein the one or more servers are associated with a web-based cloud environment.

14. The image scanning and printing system according to claim 12, wherein the scanning device and printer provide an Extensible User Interface (EUF) platform.

15. The image scanning and printing system according to claim 12, wherein the one or more servers provide a mobile print service.

16. The image scanning and printing system according to claim 12, wherein the portable communication device is one of a smart phone, mobile phone, lap top computer, desktop computer, and other personal computing device.

17. The image scanning and printing system according to claim 12, wherein the token is a token number.

18. The image scanning and printing system according to claim 12, wherein the scanning device is one of a plurality of MFDs and the printing device is one of the plurality of MFDs.

19. The image scanning and printing system according to claim 12,
a plurality of recipient email addresses are entered at the scanning device user interface in step a), and communicated to the one or more servers in step b);
the token is communicated to the plurality of recipient email addresses in step c);
a plurality of recipients associated with the email addresses each perform steps e)-h) at any one of the MFDs to obtain a hard copy of the scanned image.

20. The image scanning and printing system according to claim 12, wherein step g) validates the token before communicating the scanned image to the printing device.

21. A web-based network of one or more servers, the web-based network of one or more servers operatively connected to a scanning device including a scanner user interface, a printing device operatively independent of the scanning device including a printing device user interface, and a portable communication device, the web-based network configured to
a) receive a scanned image and recipient email address from the scanning device;
b) communicate a token to the recipient email address for viewing by a recipient associated with the portable device and not communicate the scanned image to the recipient email address;
c) communicate with the printing device to receive the token entered by the recipient at the printing device user interface; and
d) communicate the scanned image to the printing device.

22. The web-based network according to claim 21, wherein the one or more servers are associated with a web-based cloud environment.

23. The web-based network according to claim 21, wherein the web-based network of one or more servers are operatively connected to a plurality of multi-functional devices (MFDs) which provide scanning, copying and printing capability.

24. The web-based network according to claim 21, wherein the one or more servers are operatively connected to a plurality of portable communication devices.

25. The web-based network according to claim 21, wherein the recipient email address is a plurality of recipient email addresses.

* * * * *